United States Patent [19]

Spaargaren et al.

[11] Patent Number: 4,611,489
[45] Date of Patent: Sep. 16, 1986

[54] U-SHAPED CAPACITOR LEVEL GAUGE

[75] Inventors: Klaas Spaargaren; Adrianus C. W. Leyen, both of Amsterdam, Netherlands

[73] Assignee: Shell Oil Company, Houston, Tex.

[21] Appl. No.: 685,652

[22] Filed: Dec. 24, 1984

[30] Foreign Application Priority Data

Jan. 17, 1984 [GB] United Kingdom ................ 8401221

[51] Int. Cl.$^4$ .............................................. G01F 23/26
[52] U.S. Cl. .................... 73/304 C; 361/284; 377/64
[58] Field of Search .......................... 73/304 R, 304 C

[56] References Cited

U.S. PATENT DOCUMENTS

| 2,938,383 | 5/1960 | Blackburn | 73/304 R |
|---|---|---|---|
| 3,003,355 | 10/1961 | Wright | 73/304 R X |
| 3,010,320 | 11/1961 | Sollecito | 73/304 C |
| 3,935,739 | 2/1976 | Ells | 73/304 C |
| 4,019,172 | 4/1977 | Strodes | 340/518 |
| 4,083,248 | 4/1978 | Maier | 73/304 C |
| 4,099,167 | 7/1978 | Pomerantz et al. | 73/304 C X |
| 4,188,826 | 2/1980 | Kankura et al. | 73/304 R |
| 4,227,190 | 10/1980 | Kelley et al. | 73/304 R X |
| 4,314,478 | 2/1982 | Beaman | 73/304 C |
| 4,390,793 | 6/1983 | John | 73/304 R X |

Primary Examiner—Daniel M. Yasich

[57] ABSTRACT

A device for determining the position of an interface between different fluids in a tank or container is provided. This device has a plurality of cells, placed one below another and mounted on a structure which is placed in the tank or container, each cell consisting of three electrically conductive elements, isolated from each other, the first element of each cell being adapted to be connected to an AC signal source, the third element of each cell being adapted to be connected to zero potential, and the second element of each cell being adapted to be connected to a receiver for detecting the transmitted AC signal.

13 Claims, 7 Drawing Figures

U-SHAPED CAPACITOR LEVEL GAUGE

BACKGROUND OF THE INVENTION

The invention relates to a device for determining the position of an interface between different materials in a tank or container. Such devices may be used, for example, to measure the level of a fluid in a tank.

In particular, the invention relates to a fluid level gauge which is adapted to be used, for example, in storage tanks (for example, on ships or on land), in depots, road tankers, retail stations, etc.

Devices adapted to measure the position of interfaces between two or more different materials are generally known. Generally known fluid level gauges are based upon mechanical measuring principles, for example, a float connected to a level indicator. Another known fluid level gauge has been based upon the well-known capacitance measurement principle. Such capacitive gauges operate as follows.

The capacitive level gauge consists of two means, for example, isolated metal tubes, placed vertically in the fluid in the tank or container, said means forming a capacitance. The fluid fills the space between the said means and serves as a dielectric. The dielectric between the said means influences the capacitance value of the gauge. The influence of a determined dielectric on a capacitance value is known to those skilled in the art and will not be explained in detail. Since the dielectric above the level in the tank or container may be a gas, and the dielectric below the level may be a liquid, it will be clear to those skilled in the art that from a capacitance-measurement the level of this liquid in the tank can be determined.

It is also already known to use a sectionalized capacitive level gauge, comprising a plurality of sections or segments, means for measuring the values of the segment-capacitances and means for deriving information concerning the level in the tank from the measured capacitance-values. Examples of such sectionalized capacitive level gauges are U.S. Pat. Nos. 3,935,739 and 3,010,320.

However, such (sectionalized) capacitive level gauges are less suitable to be used in conductive fluids, for example water. Further, such devices can not be used in multi-phase mixtures, for example mixtures of water, oil and gas. Thus, these known gauges can only be used in determining the position of an interface between fluids which have clearly different dielectric constants.

If the dielectric constants of the different fluids are the same, or nearly the same the position of the said interface can not be determined accurately. These and other limitations and disadvantages of the prior art are overcome by the present invention, and improved apparatus are provided for measuring fluid interfaces.

SUMMARY OF THE INVENTION

It is therefore an object of the present invention to provide a simplified and cheap level gauge, for example for use in retail stations, depots, storage tanks, ships, road tankers and the like, which operates in conductive as well as in non-conductive fluids.

It is another object of the invention to provide a level gauge which can operate over a large range of temperatures and is suitable for operation in many fluids including crude oil and chemicals, in which the differences in dielectric constants are not very large.

It is another object of the invention to provide a level gauge which is not sensitive to fouling and is capable of measuring more than one interface, such as gas/liquid or liquid/liquid interface in a container containing gas, oil and water.

The invention therefore provides a device for determining the position of an interface between different fluids in a tank or container, comprising a plurality of cells, placed one below another and mounted on a structure which is placed in the tank or container, each cell consisting of three electrically conductive elements, isolated from each other, the first element of each cell being adapted to be connected to an AC signal generating means, the third element of each cell being adapted to be connected to zero potential, and the second element of each cell being adapted to be connected to a signal detecting means for detecting the transmitted AC signal.

The invention will now be described in more detail by way of example with reference to the accompanying drawings.

DETAILED DESCRIPTION OF PREFERRED EMBODIMENTS

Figure 1:
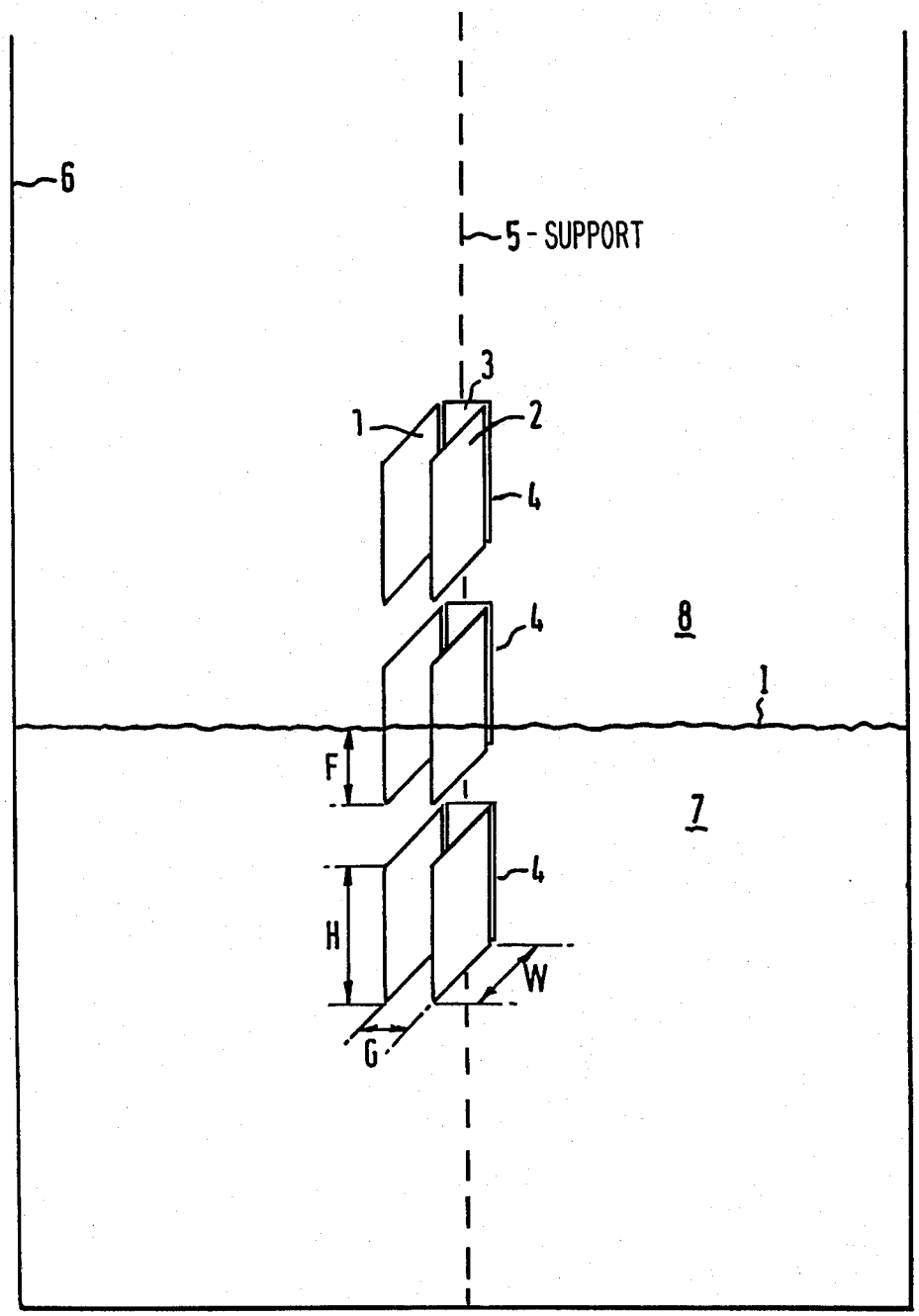
FIG. 1 represents schematically a longitudinal section of the device for measuring fluid level according to the invention.

Referring now to FIG. 1 a level gauge structure has been shown schematically.

The level gauge structure consists of a plurality of cells 4 arranged one below another and mounted in any way suitable for the purpose on a sturdy mechanical structure or support 5 (not shown for reasons of clarity) which is placed in vertical direction in a vessel or container 6 containing liquid 7 and gas 8. The support 5 may be a metal bar suitably connected to elements 3. Thus, a liquid/gas interface I is present. However, it will be appreciated that the invention is not restricted to measuring the position of liquid/gas interfaces. In this example, only three cells 4 have been shown for reasons of clarity. However, it will be appreciated that any number of cells suitable for the purpose can be used. Each cell 4 has a location and a "value". The location of each cell is the position of the said cell in the arrangement of cells and is accurately known for each cell. The "value" of each cell depends on the amount and the electrical properties of the medium or fluid in the said cell. This "value" of all cells is measured electrically and this measurement will be described in more detail below. Each cell 4 may consist of 3 flat electrically conductive elements 1, 2 and 3 respectively, isolated from each other and arranged in a U-form. The planes 1 and 2 are arranged opposite each other, having a height H and a width W.

In an advantageous embodiment the elements 1, 2 and 3 are planes. However, it will be appreciated that any shape and arrangement suitable for the purpose can be used, for example, concentric tubular elements or elements arranged in "V"-form. The "V"-shape can be used in an advantageous manner in materials with sticking or fouling properties or having a high viscosity.

Each cell 4 is adapted to detect the presence of fluid, in this case gas or liquid. It behaves as a sensor, responding to two electrical properties of the medium in the gap G between the planes 1 and 2.

The "value" of each cell 4 depends on electrical conductivity, on dielectric constant of the medium in the cell, on height F of the liquid in the cell and on the geometry and materials of the cell itself. As already discussed earlier, for the determination of a fluid column in the level gauge the "values" of all cells are measured electrically. The "values" of cells fully immersed in liquid differ from those immersed in gas. The cell containing the gas/liquid interface will have an intermediate "value". By inspection of all values the number of cells fully immersed can be determined, so the location of the cell containing the gas/liquid interface is known. For this cell the fraction of immersion can be determined accurately by interpolation using the values of neighboring cells which are fully in the liquid and in the gas respectively. The interpolation-technique as such is known to those skilled in the art and will not be described in detail. From the above it will be clear that the determination of liquid level F in the cell is independent of the properties of the media in the respective cells.

The total liquid column is the sum of the location of the cell containing the relevant interface and the liquid level F in that cell.

Thus, the liquid level in the container or tank can be determined if a level gauge is accurately positioned in the container or tank.

In the above it is assumed that a linear relation exists between the "value" of a cell and the interface level F.

However, at the extreme ends of a cell non-linearities may occur, for example a cell situated close to an interface is already influenced slightly by that interface. To minimize these effects the distances between the cells should be chosen in an appropriate way, for example 1 mm.

Application of the interpolation on 4 cells instead of 3 reduces the "end effects".

Figure 2:
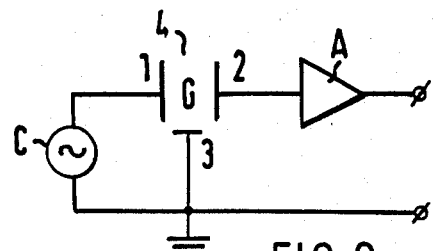
FIG. 2 shows schematically a block diagram representing the measuring principle of a cell as used according to the invention.

FIG. 2 shows schematically the operating principle of each cell.

As already discussed earlier, each cell 4 comprises elements 1, 2 and 3 consisting of electrically conductive planes, isolated from each other and arranged in such a way that a gap G exists, in which fluid can enter. Plane 3 is connected to zero potential. Each conductive plane may be in direct contact with the fluid or may, if desirable, be isolated from the fluid by means of an isolation layer (not shown).

As already discussed earlier, the "value" of the cell depends on the transfer of an electrical signal from plane 1 to plane 2. Such a transfer is influenced by plane 3 The said transfer depends on the combination of conductive and dielectric effects of the fluid or medium in the gap G.

The plane 1 is connected in any suitable way to an AC signal generator C. In an advantageous embodiment of the invention an AC signal in the frequency range 10 kHz–100 kHz, in particular a 25 kHz AC signal, is generated.

The plane 2 is connected in any suitable way to a detecting means comprising an AC amplifier A. The AC output signal from the amplifier A can be processed in any way suitable for the purpose in order to derive information about the position of the interface. The output voltage of the amplifier A is proportional to the signal transfer from plane 1 to plane 2. In an advantageous embodiment of the invention the said detecting means is an amplitude-detector, detecting a change in amplitude of the transmitted AC signal.

Figure 3A:
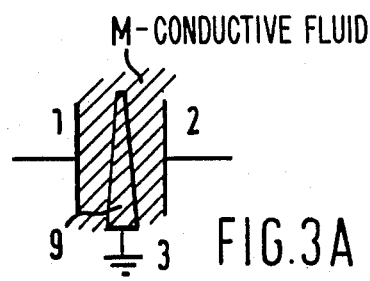
FIG. 3A represents schematically the influence of the third element of the cell as used according to the invention on the signal transfer between the first and second element of said cell, in case of a conductive medium being present in the said cell.

If a conductive fluid or medium M is present in the cell, the plane 3 causes a kind of conductive area 9 in the fluid, forming a "screen" between planes 1 and 2 (see FIG. 3A) so that the signal transfer from plane 1 to plane 2 is highly influenced.

Figure 3B:
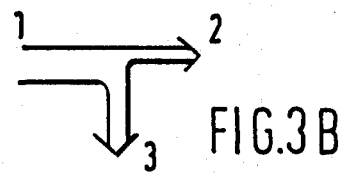
FIG. 3B represents schematically the signal transfer of FIG. 3A.

FIG. 3B shows schematically that the majority of the signal from plane 1 is routed via plane 3 and that only a small part of the signal is received at plane 2. Thus, in a highly conductive medium the output of the amplifier A will be low.

In case of a non-conductive fluid or medium the signal transfer between planes 1 and 2 will be determined mainly by the dielectric constant of the medium in the cell and consequently the influence of plane 3 will be small.

Thus, in a medium having a high dielectric constant the output of the amplifier A will be high.

In gas having a dielectric constant approximately 1 the output of the amplifier A will have an intermediate value.

It will be appreciated that in case of isolated planes 1, 2 and 3 the operation is slightly more complicated but analogous to the above description.

Figure 4:
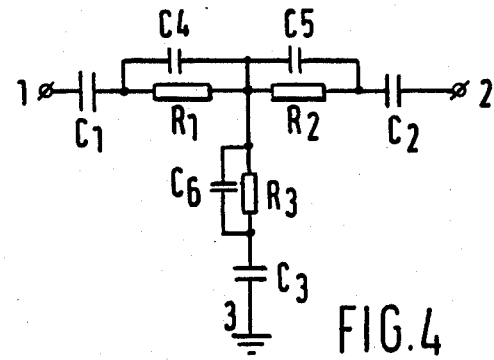
FIG. 4 represents schematically an equivalent circuit for a cell with isolated elements in a conductive medium.

FIG. 4 represents an equivalent circuit for a cell having isolated planes in a slightly conductive medium.

Reference numerals 1, 2 and 3 indicate isolated planes 1, 2 and 3 of the cell 4 of FIG. 2.

$C_1$, $C_2$ and $C_3$ represent capacitances of the isolated planes 1, 2 and 3 respectively. $R_1$, $R_2$, $R_3$ and $C_4$, $C_5$, $C_6$ are determined by the electrical properties (conductivity and dielectric constant respectively) of the liquid.

Figure 5:
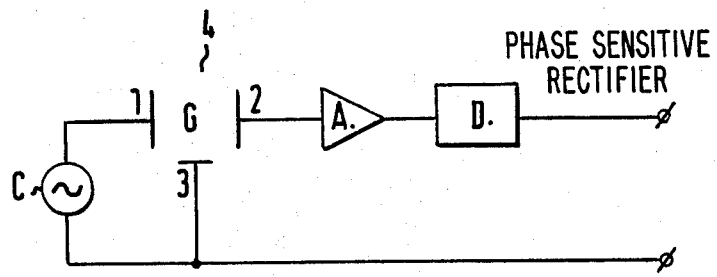
FIG. 5 shows schematically a block diagram of a cell used in an advantageous embodiment of the invention.

FIG. 5 shows an improvement of the embodiment of FIG. 2.

Reference numerals 1, 2, 3, 4, C and A are the same as used in FIG. 2. The output of the amplifier A is now connected to a phase sensitive rectifier D. It appears that the transfer of a signal from plane 1 to plane 2 is not only related to the amplitude of the signal, but also to the phase. Thus, the phase sensitive rectifier D not only provides a highly linear replica of the AC output signal of the amplifier A, but also results in DC output changes as a result of changes in parameter values of the network of FIG. 4, which would be unnoticed with an amplitude detector alone. It will be appreciated that in an advantageous embodiment of the invention each cell 4 is provided with its own AC generator and amplifier/detector.

Figure 6:
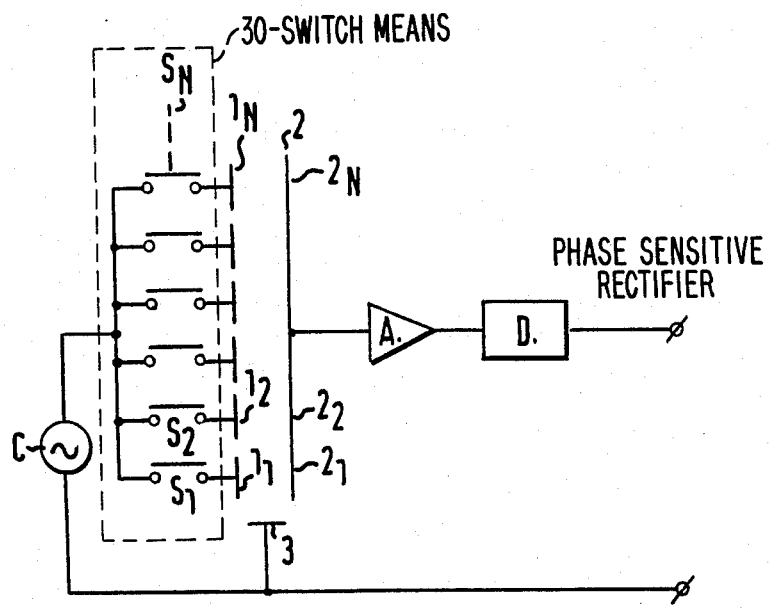
FIG. 6 shows schematically a block diagram of an advantageous embodiment of the device according to the present invention.

FIG. 6 shows schematically a block diagram of an advantageous embodiment of the device according to the invention. The AC generator C is connected through a plurality of switch means $S_1 \ldots S_N$ to the planes $1_1 \ldots 1_N$ of the respective cells, which are arranged below each other in a vertical direction. (For the sake of clarity no construction details and connections between the cells have been represented). The planes $2_1 \ldots 2_N$ are placed at a determined distance from the respective planes $1_1 \ldots 1_N$.

In this embodiment all planes $2_1 \ldots 2_N$ of the respective cells are connected together, so that one long pick-up plate 2 extends over the whole length of the level gauge.

Starting from the bottom and going to the top the values of all cells are measured in sequence by a suitable device such as for example common gauge-head electronics (not shown), digitized and transmitted serially to a receiver-computer (not shown) in order to obtain level information. However, it will be appreciated that the step of measuring the "values" of the cells can be carried out in any way suitable for the purpose and is not necessarily restricted to starting from the bottom and going to the top. Further, the electronics and further processing devices may be situated in any way suitable for the purpose. For example, electronic circuits (not shown) may be located near the cells and the pick-up plate; but, as already indicated, it will also be possible to use electronics placed on top of the level gauge or even outside the tank or container. In the latter case operation of the device is possible at much higher temperatures in the tank.

For the sake of clarity the electronics and further processing devices have not been represented. As already indicated earlier the measured amplitude of a transmitted signal of a cell situated below the fluid level has a determined "value" and this "value" differs from the "value" of a cell above the fluid level.

By determining the "values" of all cells, for example serially, a change in these "values" can be determined and information about fluid level can be derived therefrom.

In another advantageous embodiment of the invention (not shown for reasons of clarity) plane 3 can be in the form of a metal bar giving rigidity to the structure. In a further advantageous embodiment (not shown for reasons of clarity) plane 2 can be in the form of a wire.

In FIG. 6 the switch means $S_1 \ldots S_N$ are located close to the respective cells in order to reduce wiring and stray effects. However, it is also possible to locate the switch means at a certain distance. The switch means may be activated in any suitable way, for example mechanically, magnetically or electronically.

In an advantageous embodiment of the invention shift registers are used as a switch means. It will further be appreciated that the cells may have any size and configuration suitable for the purpose. In an advantageous embodiment of the invention the heights of the cells are 7 mm, the widths are 8 mm and the gaps G between the planes 1 and 2 are 5 mm; whereas the vertical distances between the cells are 1 mm.

In this way, level gauges up to 4 m are feasible and errors in the level determination are within 0.5 mm.

Various modifications of the present invention will become apparent to those skilled in the art from the foregoing description and accompanying drawings. Such modifications are intended to fall within the scope of the appended claims.

What is claimed is:

1. Apparatus for determining the position of an interface between different fluids, comprising:
   at least one cell means, said cell means having first, second and third electrically conductive members vertically isolated from and insulatingly disposed adjacent each other with said third member proximate a vertical edge of both said first and second members;
   signal generating means interconnected with said first member;
   signal detecting means interconnected with said second member; and
   zero potential means interconnected with said third member.

2. The apparatus of claim 1, wherein said first and second members form a gap therebetween.

3. The apparatus of claim 1, wherein said members are disposed in a U-shaped form.

4. The apparatus of claim 1, wherein said members are planar members.

5. Apparatus for determining the position of an interface between different fluids in a container, comprising:
   a plurality of cells disposed in a vertical column in said container;
   wherein each cell consists of first, second and third electrically conductive members vertically isolated from and insulatingly disposed adjacent each other with said third member proximate a vertical edge of both said first and second members;
   signal generating means interconnected with said first member;
   signal detecting means interconnected with said second member; and
   zero potential means interconnected with said third member.

6. The apparatus of claim 5, wherein each of said first and second members of said cells form a gap therebetween.

7. The apparatus of claim 5, wherein each of said members of said cells are disposed in a U-shaped form.

8. The apparatus of claim 5, wherein each of said members of said cells are planar members.

9. The apparatus of claim 5 further comprising means for deriving information about the position of said interface from the detected AC signals.

10. The apparatus of claim 9 further comprising switch means adapted to connect each of the said first elements of each cell to the said AC signal generating means.

11. The apparatus of claim 10, wherein the said switch means are shift registers.

12. The apparatus of claim 5, wherein each of the said second members of said cells are interconnected to form one long plate extending over the whole length of said apparatus.

13. The apparatus of claim 5, wherein each of the said third elements of said cells are interconnected to form one long metal bar.

* * * * *